June 10, 1958
A. DAPELO
2,838,594
FAULT DETECTING CABLE SHEATH
Filed March 4, 1954
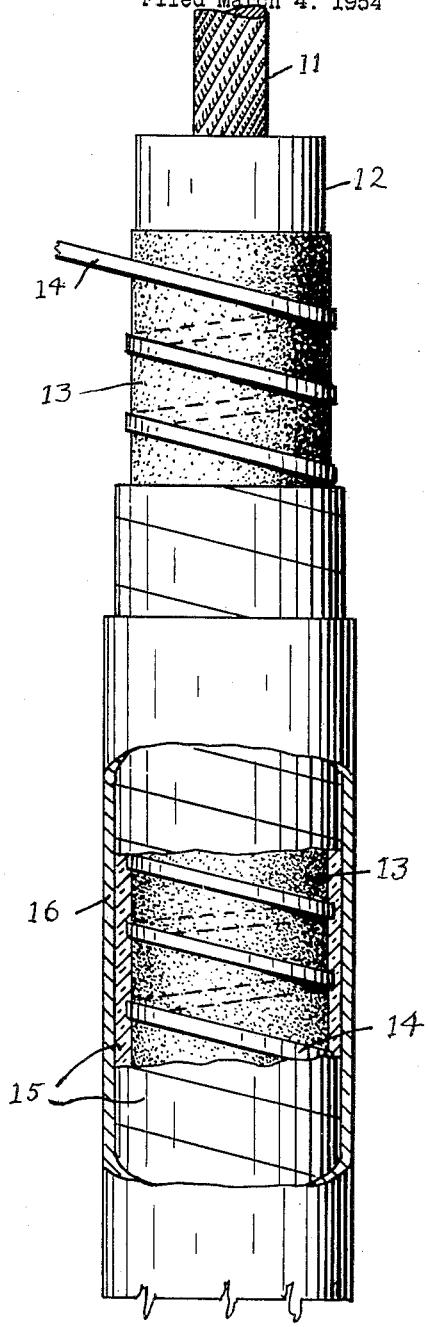
INVENTOR.
ALDO DAPELO
BY
ATTORNEY.

United States Patent Office 2,838,594
Patented June 10, 1958

2,838,594
FAULT DETECTING CABLE SHEATH

Aldo Dapelo, Genoa, Italy

Application March 4, 1954, Serial No. 414,190

Claims priority, application Italy March 9, 1953

3 Claims. (Cl. 174—115)

This invention relates to electric cables and particularly to the covering sheaths of such cables.

It is a known fact that notwithstanding the careful construction of the insulating layers or sheaths of a modern electric cable, damages in said insulation occur by bad handling during the laying of the cable, or by galvanic corrosion, recrystallization processes, the influence of an extended exposure to low temperatures or the like. This is particularly dangerous for underground and underwater cables where such damages are not detected immediately. Thus, when a damage to the insulation or the sheaths of a cable happens, moisture enters slowly that will inevitably after some time render the cable inoperative and consequently will cause an interruption of the service of any connected electric power plant or electric communication system. Usually, when a damage of the kind described occurs in an electric cable, secondary conditions in the circuit take place by which the localization of the damage point is rendered difficult and inaccurate, if not impossible.

It is intended by this invention to provide for new and improved means in order to overcome the aforementioned difficulties.

Objects and advantages of the invention will be set forth in part hereafter and in part will be obvious herefrom or may be learned by practicing the invention, the same being realized and attained by means of the instrumentalities and combinations pointed out in the appended claims.

The invention consists in the novel parts, construction, arrangements, combinations and improvements herein shown and described.

It is an object of this invention to provide for conductive means placed within the insulation of an electric cable for the detection and localization of damages and defects.

Another object of this invention is to provide for a very practical, efficient, reliable and economical instrumentality comprising means of different conductivity to facilitate an early detection and precise localization of defects before major damage occurs.

Various further and more specific purposes, features and advantages will clearly appear from the detailed description given below taken in connection with the accompanying drawing which forms part of this specification and illustrates merely by way of example one embodiment of the device of the invention.

In the following description and in the claims, parts will be identified by specific names for convenience, but such names are intended to be as generic in their application to similar parts as the art will permit. Like reference characters denote like parts in the drawings, which illustrates a preferred embodiment in which the invention may be realized.

Referring now in more detail to the drawing, there is disclosed a cable, comprising one or more service conductors 11 or the like, insulated by a conventional layer of insulating material 12, corresponding to the character of the cable and the code standards. A high resistance conductive sheath 13 consisting of conducting paper, graphite coated paper, conducting plastic material or the like, which may have hygroscopic properties, is circumposed about said insulating material 12. A metallic, homogeneous and calibrated conductor 14 of known specific resistance per unit of length is coiled helically at a constant pitch about and in contact with said high resistance conductive sheath 13 throughout the full length of the cable and has facilities for connecting a resistance measuring device at its end to it. A layer of insulating material 15 is arranged around the high resistance conductive sheath 13 and the helically coiled metallic conductor 14. An outer sleeve 16 made of metal or any other suitable material is circumposed about said layer 15 of insulating material, thus providing for the necessary mechanical strength of the cable and for as much protection against damage as possible.

It is obvious that moisture will start to penetrate into the cable if a damage of the outer sleeve occurs. Such moisture when reaching the high resistance conductive sheath 13 will cause either a direct grounding between the adjacent area of the helical conductor 14 or through a short distance of the moistened or absorbent graphited paper of said sheath 13 at the point of the defect of the cable. Since the difference of conductivity between the sheath 13 and the coiled conductor 14 is of a high order, all current induced for measuring purposes to said conductor 14 will pass through it so that the point of defect may be found easily and precisely by using convenitonal resistance measuring devices.

While the invention has been described and illustrated with respect to a certain particular preferred example which gives satisfactory results, it will be understood by those skilled in the art after understanding the principle of the invention, that various other changes and modifications may be made without departing from the spirit and scope of the invention and it is intended therefor in the appended claims to cover all such changes and modifications.

What is claimed is:

1. In an electric cable, an inner conductive core, an insulating sheath surrounding said core throughout its length, a high resistance conductive sheath circumposed about said insulating sheath throughout the length of the latter, a conductor of known specific resistance per unit of length helically coiled at a constant pitch about and in contact with said high resistance conductive sheath throughout the full length of the latter and having at least one end adapted for connection to a resistance measuring device, an insulating layer circumposed about said helically coiled conductor and conductive sheath, and a metal sleeve circumposed about said insulating layer spaced from said conductor.

2. An electric cable according to claim 1, wherein said conductive sheath is provided with a graphite surface coating, and said conductor is fabricated of uncovered metallic wire in contact with said graphite coating.

3. An electric cable according to claim 2, wherein said graphite coated high resistance conductive sheath is fabricated of absorbent material.

References Cited in the file of this patent
UNITED STATES PATENTS

| | | |
|---|---|---|
| 2,415,652 | Norton | Feb. 11, 1947 |
| 2,446,387 | Peterson | Aug. 3, 1948 |
| 2,691,698 | Schmidt | Oct. 12, 1954 |

FOREIGN PATENTS

| | | |
|---|---|---|
| 22,355 of 1915 | Great Britain | Nov. 3, 1913 |
| 164,965 | Great Britain | June 23, 1921 |
| 647,753 | Great Britain | Dec. 20, 1950 |